May 12, 1925.
E. W. MEYER
1,537,544
SIGNALING DEVICE FOR MOTOR VEHICLES
Filed June 11, 1924 2 Sheets-Sheet 1
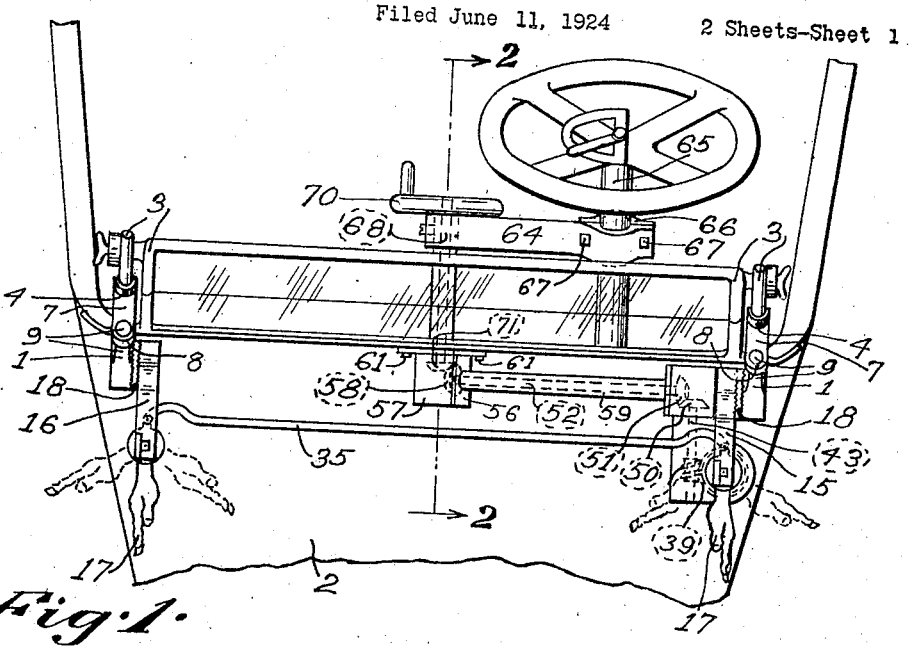
Fig. 1.
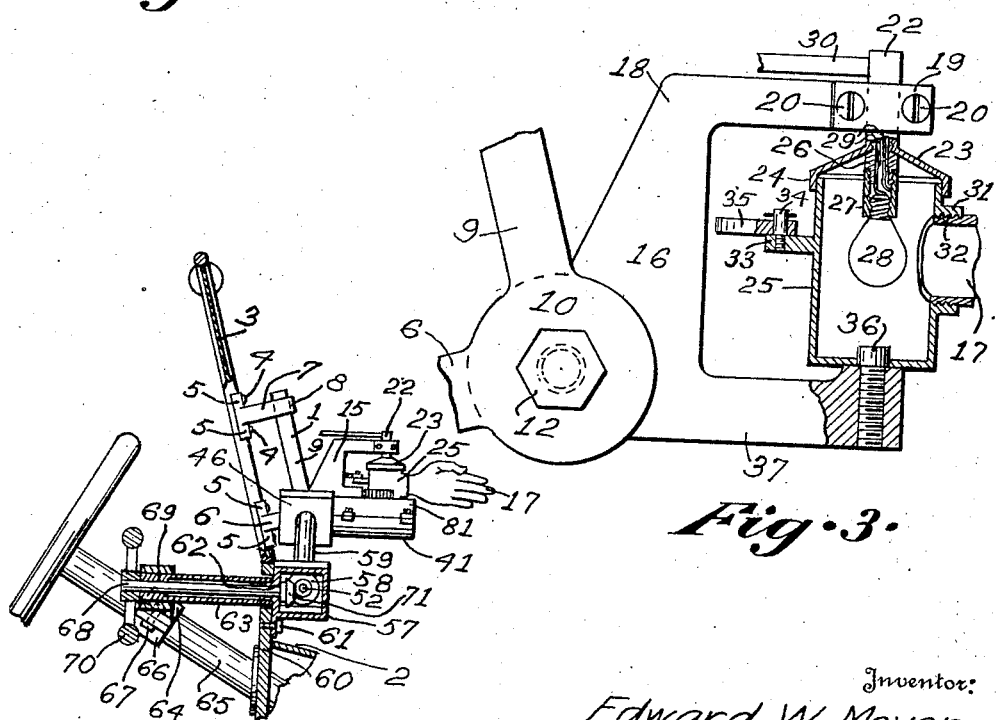
Fig. 3.
Fig. 2.
Inventor:
Edward W. Meyer,
By Hugh K. Wagner,
Attorney.

May 12, 1925.

E. W. MEYER 1,537,544

SIGNALING DEVICE FOR MOTOR VEHICLES

Filed June 11, 1924

Inventor:
Edward W. Meyer,
By Hugh H. Wagner
Attorney.

Patented May 12, 1925.

1,537,544

UNITED STATES PATENT OFFICE.

EDWARD W. MEYER, OF ST. LOUIS, MISSOURI.

SIGNALING DEVICE FOR MOTOR VEHICLES.

Application filed June 11, 1924. Serial No. 719,289.

*To all whom it may concern:*

Be it known that I, EDWARD W. MEYER, a citizen of the United States, residing at the city of St. Louis, in the State of Missouri, have invented certain new and useful Improvements in Signaling Devices for Motor Vehicles, of which the following is a specification.

This invention relates generally to signaling devices, and pertains in particular to signaling devices for vehicles.

The principal object of this invention is to provide a device which will simulate the human hand in indicating to pedestrians or drivers of other vehicles any intended change in the movement or course of the vehicle.

Another object is to provide such a device which will be self-luminous.

Another object is to provide a pair of such indicators, there being one on each side of the vehicle.

A further object is to provide means for operating the said pair of indicators in unison.

Another object is to provide an operating connection extending from the indicator to a point within convenient reach of the driver of the vehicle.

Another object is to provide adjustable means for attaching the device to different types of vehicles, whereby compensation may be effected for variation, as respects the various types of vehicles, in the inclination of the windshield frame or other suitable surfaces which may admit of the attachment of the device thereto.

Other objects and advantages will appear in the course of the following description.

In the accompanying drawings forming part of this specification, in which like numbers of reference denotes like parts wherever they occur, Figure 1 is a fragmentary plan view of a motor vehicle having attached thereto the signaling device of this invention;

Figure 2 is a vertical sectional view on the line 2—2 of Figure 1;

Figure 3 is an enlargement elevational view of the form of indicator used at one side of the vehicle, parts being shown in section;

Figure 4:
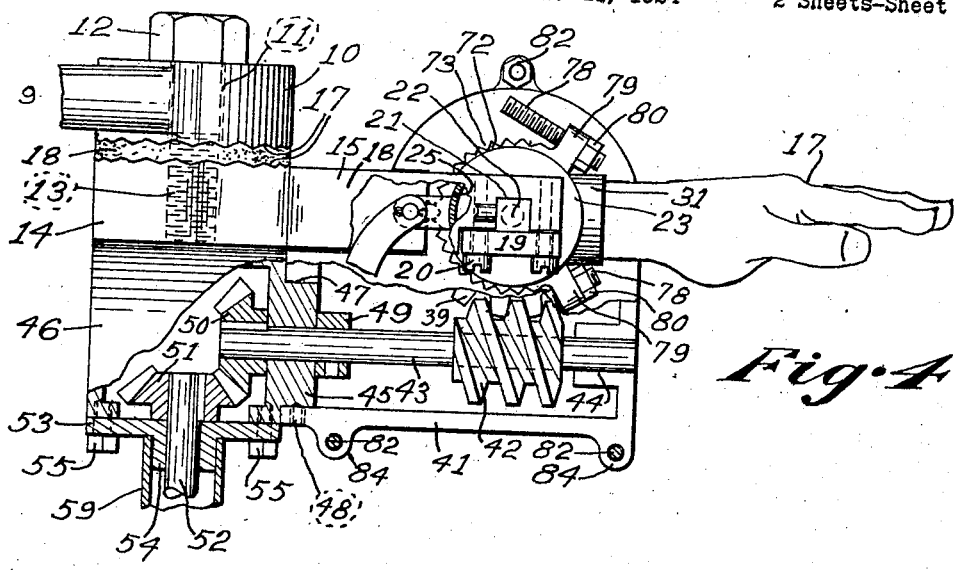
Figure 4 is an enlarged plan view of the form of indicator employed at the opposite side of the vehicle, partly in section.

Brackets 1 are mounted on each side of the vehicle 2, being preferably secured to the windshield frame 3 by suitable screws 4 passing through the ears or flanges 5 of arms 6 and 7 projecting from the upper and lower ends of the bracket 1. The lower arms 6 are in fixed relation to the bracket 1, being preferably integral therewith, whilst the upper arms 7 are preferably slidable thereon, the said arms 7 having sleeves 8 which surround the rods 9 of the brackets 1. This adjustable relation between the arms 6 and 7 permits variation in the spacing of the arms to clear any possible projections on the windshield frame. Arms 6 and rods 9 are joined by vertical flanges 10, forming a continuous casting or forging.

Flanges or bosses 10 are apertured at 11 to receive screws 12 fitting in threaded or tapped holes 13 in bosses or flanges 14 of other brackets 15 and 16 at respective opposite sides of the vehicle 2. The said bosses 10 and 14 are serrated on their inner sides 17, and have washers 18 interposed between their serrated sides 17, the said washers being formed of any suitable locally deformable material, such as leather. This construction, when screws 12 are loosened, allows the brackets 15 and 16 to be shifted about the screws 12 with relation to their respective brackets 1, for the purpose of compensating for the inclination of the windshield frame 3 when setting up the device thereon, so that the indicator 17 may operate in a substantially horizontal plane, the brackets 15 and 16 being held in fixed relation to the brackets 1 by tightening the screws 12.

Brackets 15 and 16 differ in certain details, but both are alike in that each presents a substantially L-shaped arm 18, extending first upwardly from the flanges 14 and then forwardly, the forward portion of each arm being cut away at one side to accommodate a cap 19, secured thereto by screws 20, for the purpose of forming a removable closure for the square recess 21 in the arm 18 adjacent the cap 19.

A hollow square post 22 is clamped in the recess 21 between arm 18 and cap 19, and enlarges at its lower end into a preferably conical cap 23, terminating in a depending cylindrical flange 24, the interior of which functions as a bearing for the upper portion of the rotatable cylindrical casing 25 journaled therein. An insulating bushing 26 is screw-threaded into the lower end of the hollow post or stem 22, and a lamp socket 27 is in turn screw-threaded on the lower end of the bushing 26. An electric lamp 28, in the socket 27 receives current through wires 29, passing from lamp socket 27 through stem 22 and thence through conduit 30 leading to the source of current on the vehicle 2.

The front of casing 25 develops laterally into an internally threaded sleeve 31; in horizontal alinement with the lamp 28, into which sleeve is threaded the externally threaded wrist 32 of the hollow artificial hand or indicator 17. This hand may be formed of any suitable material and in such manner that light from the lamp 28 is transmitted through its walls. For this purpose it may be constructed of diaphanous or finely perforated opaque material or of transparent or translucent material such as glass, celludoid, mica, rubberoid, amber, and so on. Preferably, however, red glass or celluloid is employed.

Arms 33 project rearwardly from the casings 25, and have fixed thereto upwardly projecting studs 34, which studs are connected together by a link 35 having holes therein for the reception of the said studs. The link 35 constitutes a means for causing the pair of indicators to swing in unison, any movement imparted to one casing causing the other to move in like manner.

The casing associated with the bracket 16 is pivoted at its lower end about a stud 36, projecting through a central opening in its bottom, and screw threaded into a horizontal arm 37 projecting from the boss 14, as shown in Figure 3.

Figure 5:
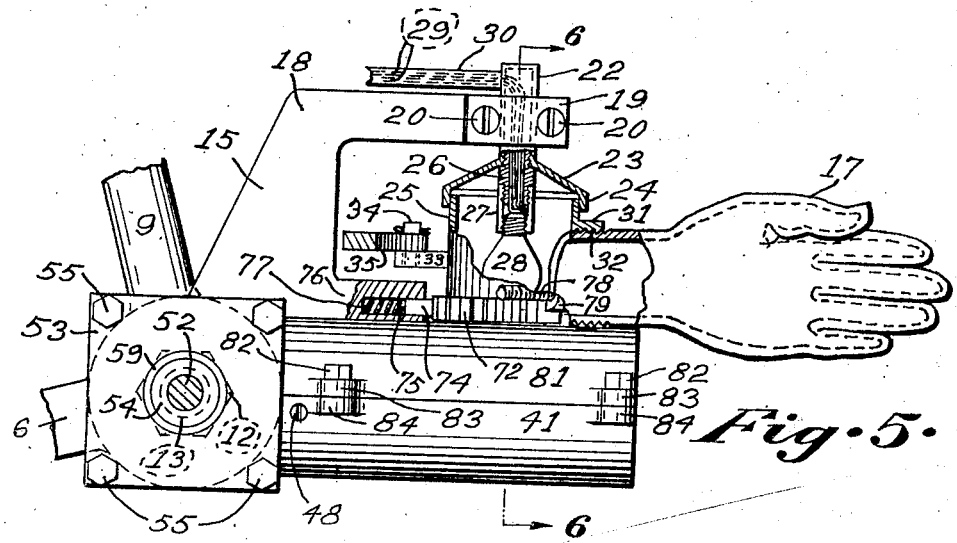
Figure 5 is an enlargement elevational view of the same, being partly in section.
Figure 6:
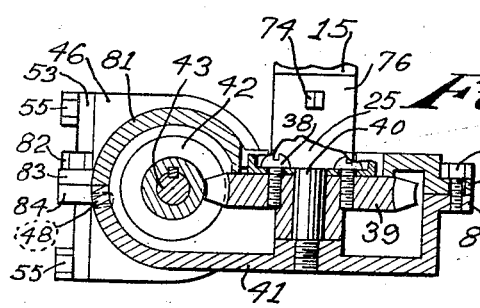
Figure 6 is a fragmentary sectional view of the same on the line 6—6 of Figure 4.

Referring now to the bracket 15, shown in detail in Figures 4, 5, and 6, the bottom of the particular casing 25 associated therewith is secured by screws 38 to the side of a worm wheel 39, journaled about a stud 40, screwed into the base section 41 of a gear housing or casing, preferably formed integral with the bracket 15.

Worm wheel 39 is driven by worm 42, fixed on shaft 43, journaled at its forward end in bearing 44, in housing 41. The other end of shaft 43 is journaled in a bushing 45, formed integral with bevel gear housing 46, and adapted to turn in cylindrical bearing 47 of housing 41 for purposes of adjustment, the said housing 46 being brought into fixed relation to housing 41, subsequent to said adjustment, by tightening the set screw 48, threaded in housing 41 and bearing against bushing 45. Shaft 43 is secured against longitudinal movement by set collar 49 and bevel gear 50, fixed thereto on opposite sides of the bushing 45.

Bevel gear 50 meshes with bevel gear 51, fixed to shaft 52, journaled in cover plate 53 and its external boss 54. Cover plate 53 is secured to housing 46 by screws 55. The other end of shaft 52 is journaled in the cover plate 56 of a gear housing 57, and is driven by bevel gear 58 fixed to that portion of the shaft 52 projecting into the housing 57. A sleeve 59, supported by the bosses 54, encloses shaft 52.

Housing 57 is preferably secured to the dashboard 60 of the vehicle 2 by means of screws 61. Boss 62 of housing 57 projects externally from the side thereof secured to the dashboard and supports a sleeve 63, the other end of which is supported by a bracket 64, secured to the steering post 65 by means of a clamping plate 66 held by screws 67. Shaft 68 is journaled at its inner end in sleeve bearing 69, and at its outer end in boss 62. Shaft 68 is driven by hand wheel 70 fixed on its inner end, and transmits its motion to bevel gear 71, fixed to that portion of shaft 68 which projects into the housing 57. Bevel gear 71 meshes with its mate 58.

One of the casings 25, preferably the one associated with the bracket 15, has fixed to its periphery a dentate ring 72, the notches 73 of which are engaged by the detent 74, slidable in square hole 75, preferably molded, or otherwise suitably formed, in the lower arm 76 of the bracket 15, and extending radially toward the rear of the casing 25, and being maintained in engagement with the said notches 73 by the action of the compressed coil spring 77, interposed between the bottom of hole 75 and the detent 74. The function of this mechanism is to restrain accidental or unintended movement of hand wheel 70 and the indicators 17.

The extent of the swinging movement of the indicator is limited by the screws 78 striking against the sides of the arm 76. Screws 78 are held in tapped holes in lugs 79, fixed to, or preferably formed integral with, the casing 25. Screws 78 are secured in fixed relation by check nuts 80.

The cover 81 co-operates with gear housing section 41 to completely enclose the gearing therein, the said cover being held by screws 82 passing through its lugs 83 and threaded into lugs 84 in section 41.

When the operator desires to change the course of his vehicle, he turns the hand wheel 70 in the proper direction, causing the indicators 17 to swing either to the right or the left, as shown in dotted lines, according to the direction in which wheel 70 is turned, the motion of the hand wheel 70 being transmitted to the indicators 17 through shaft 68, bevel gears 71 and 58, shaft 52, bevel gears 51 and 50, shaft 43, worm 42, worm wheel 39, and the casing 25 associated with bracket 15, and from thence through link 35 to the casing 25 associated with the bracket 16.

Having thus described this invention, I hereby reserve the benefit of all changes in form, arrangement, order, or use of parts, as it is evident that many minor changes may be made therein without departing from the spirit of this invention or the scope of the following claims.

I claim:

1. In a automobile signal, a bracket having spaced parallel arms, a lamp housing pivoted between said arms, a tubular extension projecting from one side of said housing, a transparent pointer mounted on the end of and opening into said extension, a lamp in said housing, and means to rotate the housing.

2. In an automobile signal, a substantially cylindrical lamp housing, a tubular lamp support extending downwardly through the top of said housing and constituting a wire conduit and housing journal, pivot means at the lower end of the housing, a bracket having upper and lower arms respectively supporting the journal and pivot means, a tubular extension projecting from one side of the housing, a lamp carried by the lower end of the lamp support and positioned opposite said extension, a transparent pointer carried by and open to said extension, and means to oscillate said housing and pointer.

3. In a automobile signal, a substantially cylindrical lamp housing, a tubular lamp support extending downwardly through the top of said housing and constituting a wire conduit and housing journal, pivot means at the lower end of the housing, a bracket having upper and lower arms respectively supporting the journal and pivot means, a tubular extension projecting from one side of the housing, a lamp carried by the lower end of the lamp support and positioned opposite said extension, a transparent pointer carried by and open to said extension, means to oscillate said housing and pointer, a second and similar housing lamp and bracket, one bracket being supported on one side of an automobile and the other on the opposite side thereof, an arm on each housing extending therefrom opposite the tubular extension, and a link connecting said arms whereby movement of the first housing similarly moves the second housing.

In testimony whereof I hereunto affix my signature.

EDWARD W. MEYER.